(12) United States Patent
Takeshita et al.

(10) Patent No.: US 6,306,236 B1
(45) Date of Patent: Oct. 23, 2001

(54) PROCESSING RELEASE PAPER AND PRODUCTION METHOD OF SYNTHETIC LEATHER

(75) Inventors: Kazuhisa Takeshita, Tokyo; Keisuke Arita, Fujisawa, both of (JP)

(73) Assignees: Ajinomoto Co., Inc.; Dai Nippon Insatsu Kabushiki Kaisha, both of Tokyo (JP)

( * ) Notice: Subject to any disclaimer, the term of this patent is extended or adjusted under 35 U.S.C. 154(b) by 0 days.

(21) Appl. No.: 09/341,126
(22) PCT Filed: Nov. 12, 1998
(86) PCT No.: PCT/JP98/05088
  § 371 Date: Oct. 1, 1999
  § 102(e) Date: Oct. 1, 1999
(87) PCT Pub. No.: WO99/24657
  PCT Pub. Date: May 20, 1999

(30) Foreign Application Priority Data

Nov. 12, 1997 (JP) ...................................... 9-327096

(51) Int. Cl.[7] ................ B44C 1/24; B44C 5/06; B44C 1/165; D06N 3/00; B05D 5/02
(52) U.S. Cl. ................ 156/196; 156/209; 156/219; 156/230; 156/240; 156/247; 156/277; 156/289; 427/147; 427/274; 428/151; 428/195; 428/904; 428/915
(58) Field of Search .................. 156/230, 240, 156/241, 247, 277, 289, 183, 196, 209, 61, 221, 210, 212, 219, 222, 228; 427/151, 195, 262, 257, 274, 356, 146, 147, 148, 389, 412; 428/151, 195, 211, 220, 446, 500, 904, 914, 473, 156; 264/219, 220, 226

(56) References Cited

U.S. PATENT DOCUMENTS

| | | | |
|---|---|---|---|
| 3,607,522 | * 9/1971 | Phillips, Jr. | 156/209 |
| 4,092,198 | * 5/1978 | Scher et al. | 156/222 |
| 4,539,056 | * 9/1985 | Takeshita et al. | 156/183 |
| 4,959,264 | * 9/1990 | Dunk et al. | 428/331 |

FOREIGN PATENT DOCUMENTS 62-41794-B2 * 4/1987 (JP) ................ B05D/1/28

* cited by examiner

Primary Examiner—Richard Crispino
Assistant Examiner—J. A. Lorengo
(74) Attorney, Agent, or Firm—Oblon, Spivak, McClelland, Maier & Neustadt, P.C.

(57) ABSTRACT

A release sheet according to the invention comprises a base release sheet, which is a laminate of a base material and a release resin layer, and a design printed sheet which can be stacked releasably on the base material of the base release sheet. Said design printed sheet have a base sheet and a convex image layer with the desired pattern positioned on the one side of the base sheet. In the release sheet according to the invention, the base release sheet may be used repeatedly and only the design printed sheet may be replaced with another one having the desired convex image layer. The use of such a release sheet makes it possible to prepare synthetic leather in various kinds and small lots.

3 Claims, 4 Drawing Sheets

PROCESSING RELEASE PAPER AND PRODUCTION METHOD OF SYNTHETIC LEATHER

TECHNICAL FIELD

The present invention relates to a release sheet and a process for the preparation of synthetic leather using this release sheet.

BACKGROUND ART

Various methods have been used for the preparation of synthetic leather which include, for example, dyeing, the treatment with a gravure coater or knife coater, or using a release sheet and the like. Among these, a method of using a release sheet is carried out in the following manner. A release sheet is provided in advance in which the desired uneven pattern is formed on the surface having releasability. A raw resin for synthetic leather is then applied on a release resin layer of the release sheet. After dried and solidified, the resin layer is released from the sheet. In a process for the preparation of synthetic leather using such a release sheet, there is a need for providing the same number of release sheets as that of the uneven designs to be applied on the synthetic leather.

Recently, with a wide variety of uses of synthetic leather, various kinds and small lots have been required in the preparation process. Although the requirement for various kinds may be satisfied by preparing various release sheets with various uneven designs, it is difficult to satisfy the requirement for small lots because a release sheet to be used should be changed every uneven designs and, therefore, the preparatory time for the preparation increases and using efficiency of raw materials is lowered. Alternatively, it may also be considered that a release sheet on which at least two uneven patterns are formed in advance is prepared to satisfy the requirement for small lots. In such a case, there is, however, a problem that it is difficult to satisfy the requirement for various kinds. Furthermore, it is also required to lower the costs for release sheets in order to satisfy the requirement for various kinds and small lots in the preparation of synthetic leather. However, there is a limit in lowering the costs for the preparation process using the prior art release sheets where a release resin layer with an uneven pattern is provided on the base material.

The present invention has been done in such circumstances. The present invention provides a release sheet in which various uneven designs can be formed in the desired amount and a process for the preparation of synthetic leather using this release sheet in which synthetic leather can easily be prepared in various kinds and small lots and it is possible to lower the costs.

DISCLOSURE OF THE INVENTION

In order to attain these purposes, the present release sheet comprises a base release sheet, which is a laminate of a base material and a release resin layer, and a design printed sheet which can be stacked releasably on the base material of said base release sheet, said design printed sheet having a base sheet and a convex image layer with the desired pattern positioned on the one side of said base sheet.

In the present invention as described above, a design printed sheet with the desired convex image layer is stacked on the base material of said base release sheet to obtain a release sheet. As a result, the base release sheet may be used repeatedly in the use of any design printed sheet. A wide variety of uneven designs can be formed by stacking two or more design printed sheets sequentially side by side on the base release sheet.

The present process for the preparation of synthetic leather is carried out in the following manner. A resin for synthetic leather is applied on the release resin layer of the release sheet according to the invention, in which the desired design printed sheet is stacked releasably on the base material of the base release sheet, to form a resin layer. As a result, an uneven design corresponding to a convex image layer of the design printed sheet is formed on the resin layer. After a base fabric is adhered to the aforesaid resin layer, the resin layer is released from the release sheet to prepare synthetic leather having the desired uneven design. In the case of preparing synthetic leather having another uneven design, another release sheet according to the invention is used in which the aforesaid base release sheet is still used repeatedly and only the design printed sheet is replaced with another design printed sheet having the desired convex image layer. Another synthetic leather may be prepared in the aforesaid manner using the release sheet thus obtained.

In another embodiment of the process for the preparation of synthetic leather according to the invention, use is made of the release sheet according to the invention wherein plural kinds of design printed sheets having different convex image layers to each other are sequentially stacked side by side releasably on the base material of the base release sheet.

According to the invention, the release sheet comprises a base release sheet, which is a laminate of a base material and a release resin layer, and a design printed sheet to be stacked releasably on the base material of said base release sheet. In the design printed sheet, a convex image layer with the desired pattern is positioned on the one side of a base sheet. It is, therefore, possible to obtain a release sheet corresponding to the desired uneven design at any time by stacking the desired design printed sheet on the base material of the base release sheet. It is also possible to form various kinds of uneven designs from one release sheet by stacking two or more design printed sheets sequentially side by side on the base release sheet. In addition, as the base release sheet can be used repeatedly in the case of using any design printed sheet, when plural kinds of uneven designs are required in the preparation of synthetic leather, its preparation costs are remarkably lowered compared to that in the use of the prior art release sheet and, therefore, for example, the requirement for various kinds and small lots in the preparation of synthetic leather may be satisfied.

BEST MODE FOR CARRYING OUT THE INVENTION

The embodiments of the present invention will be described below by reference to the drawings.

Figure 1:
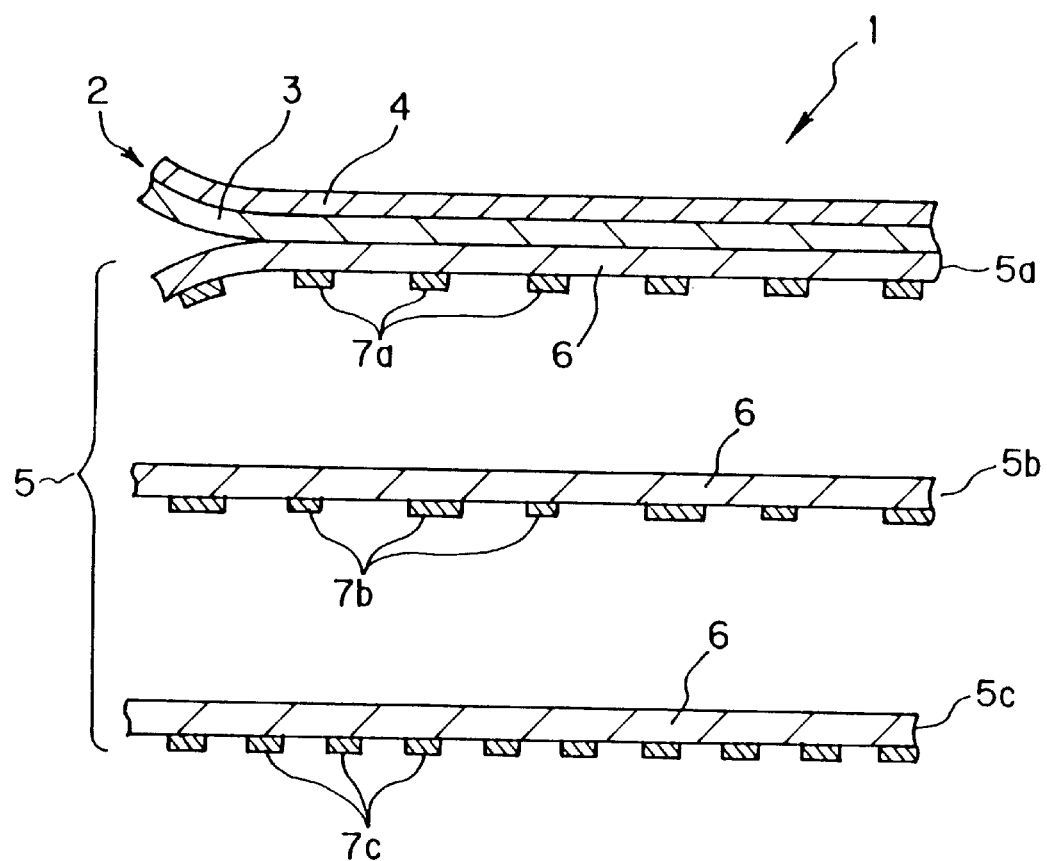
FIG. 1 is a schematic sectional view representing one example of the release sheet according to the invention.

FIG. 1 is a schematic sectional view representing one example of the release sheet according to the invention. In FIG. 1, a release sheet 1 consists of a base release sheet 2 and a design printed sheet 5 to be stacked on the base release sheet 2. The base release sheet 2 is a laminate of a base material 3 and a release resin layer 4. The design printed sheet 5 consists of design printed sheets 5a, 5b and 5c in this figure. In each of the design printed sheets 5a, 5b and 5c, convex image layers, in which each pattern is different from each other, 7a, 7b and 7c, is formed on a base sheet 6. Any design printed sheet selected from the design printed sheets 5 may be stacked on the base material 3 of the base release sheet 2. In this figure, the design printed sheet 5a is stacked on the base release sheet 2.

Figure 2:
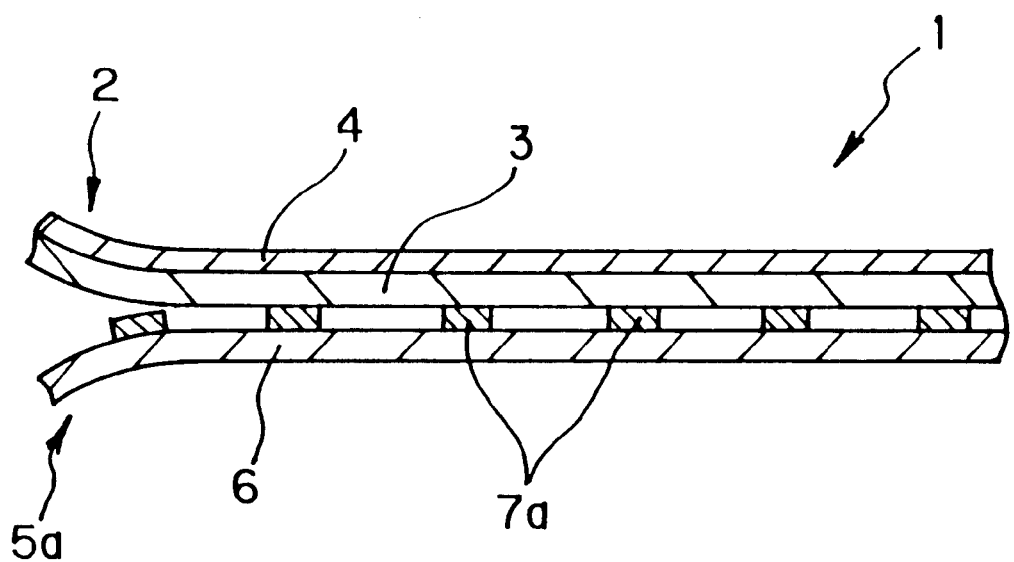
FIG. 2 is a schematic sectional view representing another example of the release sheet according to the invention.

As shown in FIG. 2, use may be made of the release sheet 1 of the invention in which the convex image layer 7a is stacked on the base material 3 of the base release sheet 2.

For the base material 3 of the base release sheet 2, use may be made of sheets such as kraft papers and free sheets, plastic films, metallic foil, textile fabrics, non woven fabrics, or a laminate thereof. A thickness of the base material 3 may be set so that an uneven pattern corresponding to the convex image layer 7a, 7b or 7c of the design printed sheet 5a, 5b or 5c may be formed on the surface of the release resin layer 4 as will be described below. It is preferred to set the thickness, for example, in a range of about 50 to 200 μm. The surface of the release resin layer side of the base material 3 may be previously heated or treated with corona in order to enhance adherence between the base material 3 and release resin layer 4.

The release resin layer 4 of the base release sheet 2 may be made of known thermoplastic resins such as acrylic resins, polyethylene resins, polypropylene resins, polymethylpentene resins, silicone resins and alkyd resins. It may be selected in consideration of releasing property from a resin for synthetic leather. The formation of the release resin layer 4 may be carried out by applying the resin on the base material 3 by means of roll coat, gravure coat or extruding coat, or by film laminate methods such as an adhesive application laminate method or a heat melting laminate method. A thickness of the release resin layer 4 may be about 3 to 100 μm, preferably 5 to 50 μm.

For the base sheet 6 of the design printed sheet 5a, 5b or 5c, use may be made of papers such as kraft papers and free sheets, plastic films, metallic foil, textile fabrics, non woven fabrics, or a laminate thereof. A thickness of the base sheet 6 may be set so that an uneven pattern corresponding to the convex image layer 7a, 7b or 7c may be formed on the surface of the release resin layer 4, in consideration of materials to be used, as will be described below. It is preferred to set the thickness, for example, in a range of about 5 to 100 μm. As shown in FIG. 2, in the case where the convex image layer 7a of the design printed sheet 5a is stacked on the base material 3 of the base release sheet 2 to obtain the release sheet 1, the thickness of the base sheet 6 may be set without considering an uneven pattern formed on the surface of the release resin layer 4.

The convex image layer 7a, 7b or 7c of the design printed sheet 5a, 5b or 5c may be formed using an ink or paint composition. Such an ink or paint composition may be one where known additives such as colorant such as pigments, plasticizers, stabilizers, wax, grease, drying agents, auxiliary drying agents, curing agents, thickeners, dispersing agents, fillers, etc. are added to vehicle at needed, which is then kneaded satisfactorily together with solvents or diluents.

Examples of the vehicle include various fats and oils such as linseed oil, soya bean oil and synthetic drying oil; natural or processed resins such as rosin, covar, dammar, hardened rosin, rosin esters and polymerized rosin; synthetic resins such as rosin modified phenol resins, phenol resins, maleic resins, alkyd resins, petroleum resins, vinyl resins, acrylic resins, polyamide resins, epoxy resins, aminoalkyd resins; cellulose derivatives such as nitrocellulose and ethylcellulose; rubber derivatives such as chlorinated rubber and cyclized rubber; glue; casein; dextrin and zein.

A foaming agent may be added to the ink or paint composition used. Examples of the foaming agent include inorganic forming agents such as sodium hydrogencarbonate, ammonium carbonate, sodium borohydride and silicon oxyhydride; organic foaming agents such as azodicarbonamide, azobisisobutyronitrile, dinitrosopentamethylenetetramine, p-toluenesulfonylhydrazide and 4,4'-oxybisbenzenesulfonylhydrazide; and, furthermore, microballoon or microsphere in which gas or an organic solvent having lower boiling point is encapsulated in a synthetic resin capsule.

The formation of the convex image layer 7a, 7b or 7c using the ink or paint composition as mentioned above may be carried out by printing methods such as offset printing, gravure printing, letterpress printing, screen printing, transfer printing and electrostatic printing; coating methods such as roll coating, knife coating, gravure coating and spraying; and drawing methods with, for example, a pen. A thickness of the convex image layer 7a, 7b or 7c may be set in a range of 5 μm to 1 mm, preferably 5 to 100 μm. The convex image layer 7a, 7b or 7c may be terraced on the surface of the base sheet 6.

A method for stacking a design printed sheet selected from the design printed sheets 5 (5a, 5b and 5c) on the base release sheet 2 is not restricted to particular ones. Consequently, any method may be used such as pressing the sheets which are sandwiched between rolls, electrostatic adherence by electrifying the sheets and removal adherence with an adhesive.

Figure 3:
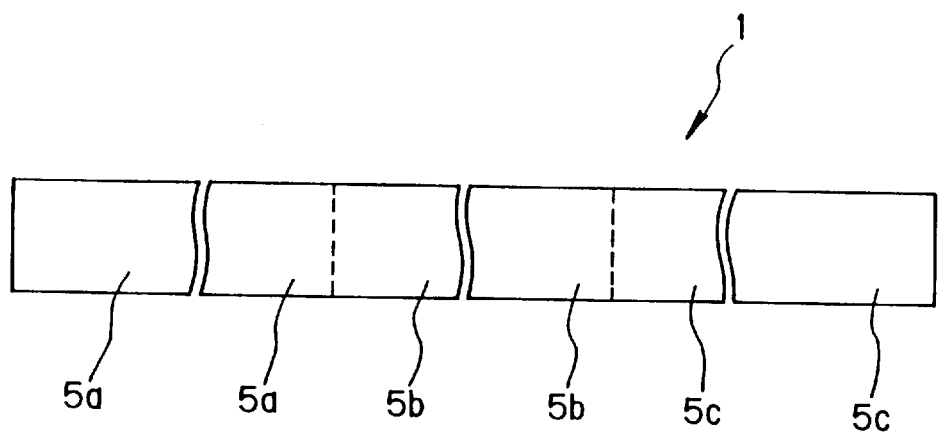
FIG. 3 is a schematic sectional view representing another example of the release sheet according to the invention.

The number of the design printed sheet to be stacked on the base release sheet 2 is not restricted. For example, as shown in FIG. 3, the design printed sheets 5a, 5b and 5c which have a shorter length than that of the base release sheet 2 are stacked sequentially side by side on the longitudinal base release sheet 2 to obtain a release sheet 1. Such a structure of the release sheet 1 makes it possible to form tree kinds of uneven designs from one release sheet 1. In this case, proper setting of each length of the design printed sheets 5a, 5b and 5c makes it possible to form the needed amount of the uneven design.

In the aforesaid embodiment, although there are mentioned tree kinds of design printed sheets 5a, 5b and 5c as a design printed sheet 5, it is not restricted to these in the present invention.

Figure 4:
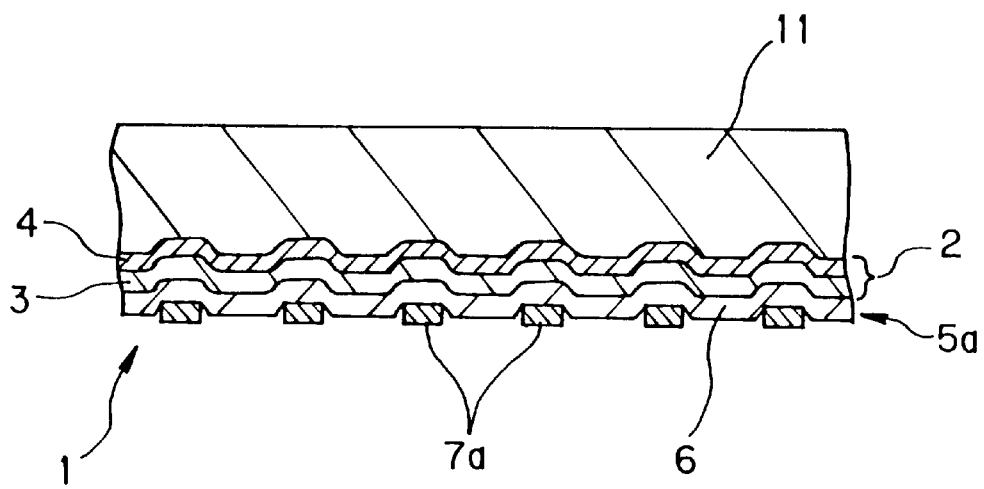
FIG. 4 is a view representing a sectional state of a release sheet in the preparation of synthetic leather.

The process for the preparation of synthetic leather using the release sheet of the present invention is carried out as follows. First, the desired design printed sheet is stacked on the base release sheet to obtain the release sheet of the present invention. Second, a resin for synthetic leather is applied on a release resin layer of the release sheet. FIG. 4 is a sectional view representing such a state. In the example as shown in FIG. 4, a design printed sheet 5a is stacked on a base release sheet 2 to provide a release sheet 1. An uneven pattern corresponding to a convex image layer 7a of the design printed sheet 5a is formed on the surface of a release resin layer 4. An uneven design corresponding to the convex image layer 7a is, therefore, formed on a resin layer 11 applied on the release resin layer 4. Later, a base fabric such as textile fabrics, non woven fabrics and the like is adhered thereto. After dried and cooled, the resin layer 11 may be released from the release sheet to obtain synthetic leather. The release sheet used can be used again in the case where the synthetic leather having the same uneven design is prepared. In the case where synthetic leather having another uneven design is prepared, the design printed sheet 5a is released from the base release sheet 2 and the desired design printed sheet is positioned there to obtain another release sheet, which is then able to be used for preparing synthetic leather.

In the process for the preparation of synthetic leather according to the invention as mentioned above, the base release sheet can be used repeatedly in the use of any design printed sheet. Therefore, in the case where plural kinds of uneven designs are required, the costs for release sheets and, therefore, preparation costs may be reduced compared to the preparation process using the prior art release sheet. In addition, the requirement for various kinds and small lots in the preparation of synthetic leather may be satisfied.

Then, the present invention will be elucidated more specifically with the concrete examples.

A polypropylene resin (made by Chisso Corp.) was extrusion coated on a free sheet (made by Oji-Seishi Corp., basis weight of 125 g/m$^2$) as a base material to form a release resin layer having a thickness of 30 μm. A base release sheet was thus obtained.

The ink composition having the following composition was used to print a predetermined pattern on a kraft paper as a base sheet using a gravure impression having a depth of 30 to 100 μm to form a convex image layer having a thickness of 3 to 15 μm. Design printed sheet A was thus obtained.

| (Ink Composition) | |
|---|---|
| Acrylic resin | 70 parts by weight |
| Body pigment | 10 parts by weight |
| Water | 20 parts by weight |

The same procedures as mentioned above were repeated, with the exception that another gravure impression having another pattern was used, to obtain design printed sheet B.

Next, synthetic leather was prepared using the release sheet consisting of the base release sheet and the design printed sheets A and B as obtained above. That is, the convex image layer of the design printed sheet A was stacked on the base material of the base release sheet to prepare a release sheet. A polyurethane resin composition for synthetic leather having a solid content of 30% was applied on the release resin layer of the release sheet by a knife coating method (clearance of 250 μm). After dried, a polyurethane resin adhesive was applied on the polyurethane resin layer by a knife coating method, which was then dried. A base fabric was adhered to the surface of the adhesive. After dried and aged, the resin layer with the base fabric was released from the release sheet to obtain synthetic leather having uneven design corresponding to the convex image layer of design printed sheet A.

Then, after design printed sheet A was released from the base release sheet, a base sheet of design printed sheet B was stacked on the base material of the base release sheet to obtain another release sheet. Polyvinylchloride paste containing a foaming agent was applied on the release resin layer of the release sheet by a roll coating method. After heated in an oven, a base fabric was bonded by pressure to the resin layer. After dried and then cooled, the resin layer with the base fabric was released from the release sheet to obtain synthetic leather having uneven design corresponding to the convex image layer of design printed sheet B.

POSSIBILITY OF INDUSTRIAL UTILIZATION

The release sheet according to the invention can satisfy the requirement for the desired uneven design. In the process for the preparation of synthetic leather according to the invention, the synthetic leather can easily be prepared in various kinds and small lots. This is very useful in industry.

What is claimed is:

1. A release sheet, comprising:

a base release sheet, which is a laminate of a base material and a release resin layer, and a design printed sheet which can be stacked releasably on the base material of said base release sheet, said design printed sheet having a base sheet and a convex image layer with the desired pattern positioned on the one side of said base sheet.

2. A process for the preparation of synthetic leather, comprising the steps of:

(1) providing a release sheet comprising a base release sheet, which is a laminate of a base material and a release resin layer, and a design printed sheet which can be stacked releasably on the base material of said base release sheet, said design printed sheet having a base sheet and a convex image layer with the desired pattern positioned on the one side of said base sheet;

(2) applying a resin for synthetic leather on the release resin layer of the release sheet, in which the desired design printed sheet is stacked releasably on the base material of the base release sheet, to form a resin layer, on which an uneven design corresponding to the convex image layer of said design printed sheet is formed, (3) adhering a base fabric to the resin layer, and (4) releasing the resin layer with the base fabric from the release sheet to obtain synthetic leather having the desired uneven design, wherein when synthetic leather having another uneven design is prepared, a second of said release sheet is obtained by using the same base release sheet and by replacing only the design printed sheet with another one having the desired convex image layer, which is then used for preparing synthetic leather by repeating the aforesaid steps (1) to (4).

3. The process for the preparation of synthetic leather claimed in claim 2, wherein use is made of the release sheet in which plural kinds of design printed sheets whose convex image layers are different from each other are stacked sequentially side by side on the surface of the base material of the base release sheet.

* * * * *